(12) United States Patent
Chen et al.

(10) Patent No.: US 11,250,044 B2
(45) Date of Patent: Feb. 15, 2022

(54) TERM-CLUSTER KNOWLEDGE GRAPH FOR SUPPORT DOMAINS

(71) Applicant: INTERNATIONAL BUSINESS MACHINES CORPORATION, Armonk, NY (US)

(72) Inventors: Zhiyu Chen, Yorktown Heights, NY (US); Yu Deng, Yorktown Heights, NY (US); Ruchi Mahindru, Elmsford, NY (US); Daniela Rosu, Ossining, NY (US); Shu Tao, Irvington, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/879,604

(22) Filed: May 20, 2020

(65) Prior Publication Data
US 2021/0365488 A1 Nov. 25, 2021

(51) Int. Cl.
G06F 16/36 (2019.01)
G06F 16/338 (2019.01)
G06F 16/33 (2019.01)

(52) U.S. Cl.
CPC ......... *G06F 16/367* (2019.01); *G06F 16/338* (2019.01); *G06F 16/3344* (2019.01)

(58) Field of Classification Search
CPC .................................................. G06F 16/367
See application file for complete search history.

(56) References Cited

U.S. PATENT DOCUMENTS

| 10,073,840 | B2 | 9/2018 | Hakkani-Tur et al. |
| 2018/0060734 | A1 | 3/2018 | Beller et al. |
| 2019/0012340 | A1 | 1/2019 | Kelly et al. |
| 2019/0012405 | A1 | 1/2019 | Contractor et al. |
| 2019/0034780 | A1* | 1/2019 | Marin .................... G06N 3/006 |
| 2019/0108226 | A1 | 4/2019 | Boxwell et al. |

(Continued)

OTHER PUBLICATIONS

Bunescu, R.C. et al., "A Shortest Path Dependency Kernel for Relation Extraction"; Proceedings of Human Language Technology Conference and Conference on Empirical Methods in Natural Language (2005); pp. 724-731.

(Continued)

*Primary Examiner* — Van H Oberly
(74) *Attorney, Agent, or Firm* — Intelletek Law Group, PLLC; Gabriel Daniel, Esq.

(57) ABSTRACT

Given a skeleton knowledge graph including first terms in respective nodes, wherein first terms in connected nodes have a predetermined relationship, an augmented knowledge graph is formed by a first computing device by extracting a second term from a domain corpus to form a term cluster linked with a respective node of the knowledge graph. The second term is associated with the first term of a respective node in the domain corpus while not meeting the predetermined relationship. A semantic feature between the second term and the associated first term is identified in the domain corpus and linked to the pair of the second term and the first term in the augmented knowledge graph. The augmented knowledge graph is useable by a second computing device, which may or may not be the same as the first computing device, to drive a conversation between a chatbot and user.

17 Claims, 12 Drawing Sheets

(56) References Cited

U.S. PATENT DOCUMENTS

2019/0122111 A1    4/2019    Min et al.
2021/0117815 A1\*  4/2021    Creed ..................... G06N 3/04

OTHER PUBLICATIONS

Das, R. et al., "Building Dynamic Knowledge Graphs from Text Using Machine Reading Comprehension" arXiv:1810.05682v1 [cs.CL] (2018); 12 pgs.

Zelinka, M. et al., "Building Dynamic Knowledge Graphs from Text-based Games"; 33rd Conference on Neural Information Processing Systems (2019); 6 pgs.

Shen, J. et al., "HiExpan: Task-Guided Taxonomy Construction by Hierarchical Tree Expansion"; KDD (2018); 10 pgs.

Meng, Y. et al., "Weakly-Supervised Hierarchical Text Classification"; Association for the Advancement of Artificial Intelligence (2019); 9 pgs.

Su, Y. et al., "Global Relation Embedding for Relation Extraction"; Proceedings of NAACL-HLT (2018); pp. 820-830.

Mell, P. et al., "Recommendations of the National Institute of Standards and Technology"; NIST Special Publication 800-145 (2011); 7 pgs.

Du, M. et al., "Weakly-Supervised Relation Extraction by Pattern-Enhanced Embedding Learning"; International World Wide Web Conference (2018); 10 pgs.

Qu, M. et al., "Weakly-supervised Knowledge Graph Alignment with Adversarial Learning"; arXiv:1907.03179v1 [cs.LG] (2019); 10 pgs.

Zhang, C. et al., "TaxoGen: Unsupervised Topic Taxonomy Construction by Adaptive Term Embedding and Clustering"; KDD (2018); 9 pgs.

Voskarides, N. et al., "Weakly-supervised Contextualization of Knowledge Graph Facts"; SIGIR (2018); 10 pga.

Xu, Y. et al., "Classifying Relations via Long Short Term Memory Networks Along Shortest Dependency Paths" Proceedings of the 2015 Conference on Empirical Methods in Natural Language Processing (2015); pp. 1785-1794.

Yang, S., "Efficiently Answering Technical Questions—A Knowledge Graph Approach"; Association for the Advancement of Artificial Intelligence (2017); 8 pgs.

\* cited by examiner

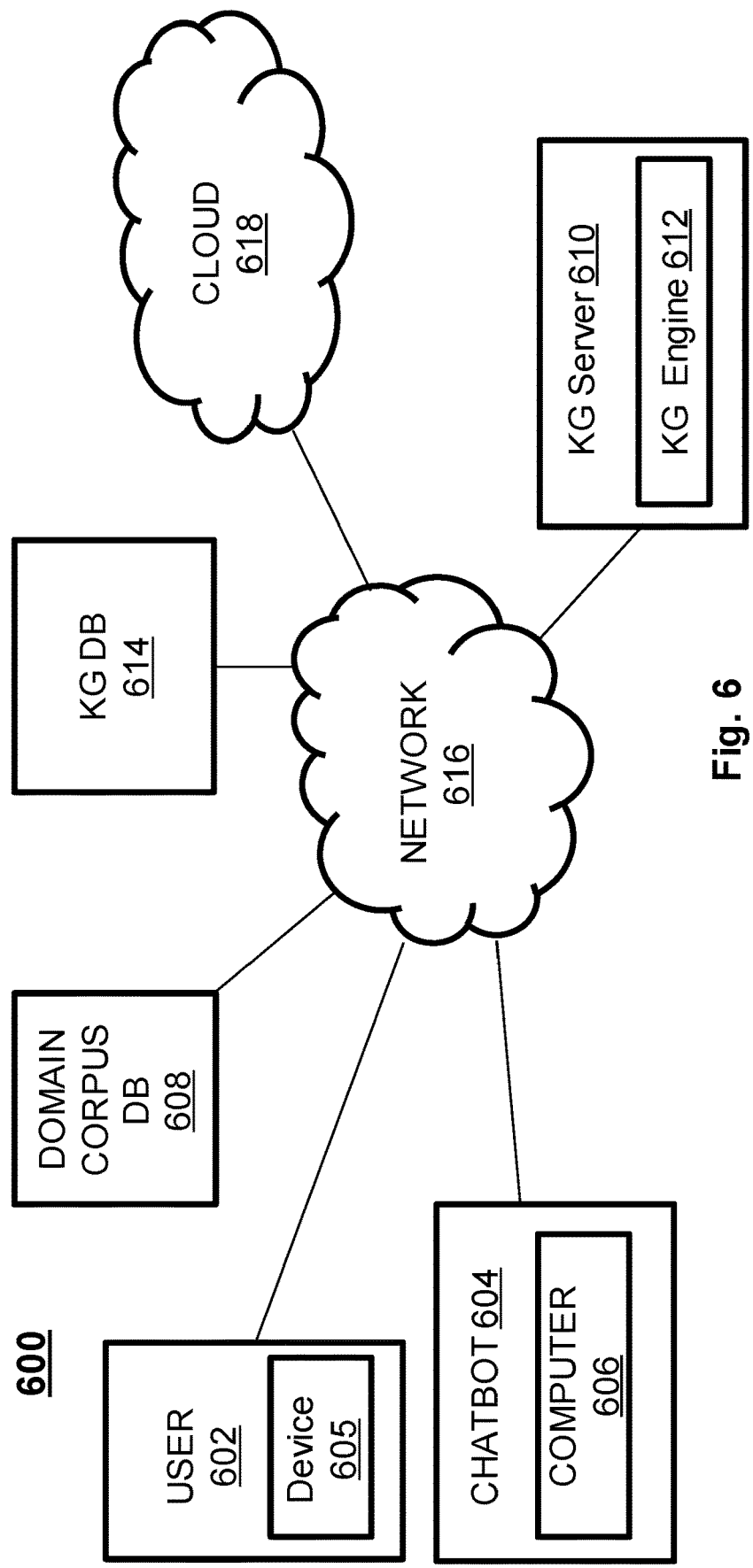

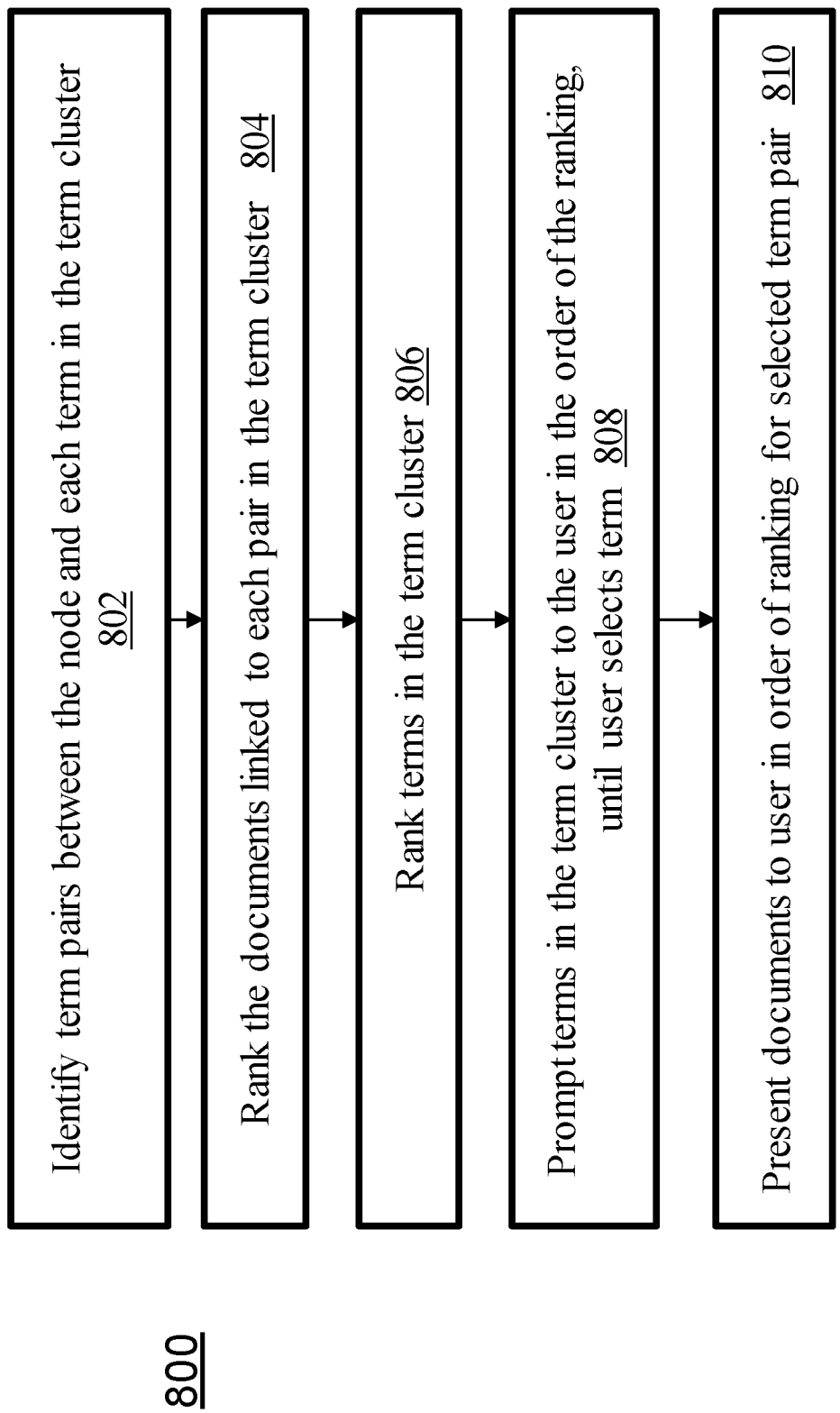

TERM-CLUSTER KNOWLEDGE GRAPH FOR SUPPORT DOMAINS

BACKGROUND

Technical Field

The present disclosure generally relates to computer systems, and more particularly, to computer systems that are configured to extract topics from documents for use in addressing user questions.

Description of the Related Art

Knowledge graphs are used by automated chatbots to conduct conversations with and provide assistance to users having questions concerning particular subject matter. For example, users may call customer service of a company with questions about a product of the company, and an automated chatbot attempts to address the questions. The knowledge graphs, which are derived from available information or domain knowledge, such as available documents, organize available information in the form of a graph, for example. The knowledge graph includes nodes that represent data items or terms, and the relation between one node and another. The knowledge graph enables the chatbot to progress from one data item to another, where the nodes have a defined relationship. For example, the relationship among the nodes of the knowledge graph may be "component of," where one node is a component of an adjacent node. The knowledge graph is used to drive the conversation with the user and find relevant answers to the user's questions.

SUMMARY

A computer implemented method for the generation of a knowledge graph with term clusters by a first computing device, is disclosed. Given a skeleton knowledge graph including first terms in respective nodes, wherein first terms in connected nodes have a predetermined relationship, the method forms an augmented knowledge graph by extracting a second term from a domain corpus to form a term cluster linked with a respective node of the knowledge graph. The second term is associated with the first term of the respective node in the domain corpus while not meeting the predetermined relationship. A semantic feature is identified in the domain corpus between a pair of the second term and the associated first term, and the identified semantic feature is linked to the pair in the augmented knowledge graph. The augmented knowledge graph is useable by a second computing device to drive a conversation between a chatbot and a user. The second computing device may the same or different than the first computing device. A computer implemented device is also disclosed.

According to another embodiment, a non-transitory computer readable storage medium tangibly embodying a computer readable program code having computer readable instructions is disclosed that, when executed by a computing device, causes a chatbot device to drive a conversation with a user. Nodes of an augmented knowledge graph including first terms in respective nodes, wherein first terms in connected nodes have a predetermined relationship, are used to address non-ambiguous queries. The first terms are extracted from a domain corpus. Second terms in term clusters linked to respective nodes of the augmented knowledge graph are used to address ambiguous queries. The second terms in the term clusters are associated with the first terms of the respective nodes in the domain corpus and do not meet the predetermined relationship. Second terms in the linked term cluster are ranked and the second terms are presented to the user in an order of the first ranking.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 6 is a block diagram of an example of a system that is configured to generate augmented knowledge graphs and optionally augmented information, and to conduct a conversation with a user by a chatbot, in accordance with an embodiment of the disclosure.

FIG. 7A and FIG. 7B show a flow chart of an example of reasoning in a cluster term to find other strongly associated terms or actions the user is possibly interested in.

FIG. 8 is a flow chart of an example of a process for ranking documents and terms to create an order of prompting of terms by the chatbot.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Embodiments of the present disclosure generally relate to methods and systems for automatically generating augmented knowledge graphs from a domain to support chatbots in conversations with users. The generated augmented knowledge graphs have additional information in the form of term clusters that provide additional options for the chatbot to present to a user, to guide a user through a conversation. A term cluster is a grouping of one or more terms that are found in the domain corpus in association with the term of a respective node in the knowledge graph but do not have a clearly defined relationship with the node. An augmented knowledge graph may have one or more term clusters. Having a relationship that is not clearly defined means that a pair of terms have an association, but such association does not meet any of the one or more predetermined relationships represented in the knowledge graph.

Generation of knowledge graphs may be facilitated by labelled data in a domain corpus. Labelled data is not always available, however. Use of computer implemented systems and computing devices in accordance with embodiments of the disclosure enables generation of augmented knowledge graphs with little or no prior knowledge of the domain, including labeled or tagged data. In addition, use of the associated terms in the clusters that supplement the terms in nodes of the knowledge graph is based on automated analysis of semantic features in phrases, sentences, passages, and/or documents in the domain corpus in order to identify and extract terms that have an unclear relationship to nodes of the knowledge graph but have a predetermined degree of association with the nodes. It is not feasible to consistently identify and extract the cluster terms from a large corpus manually.

Embodiments of the disclosure also describe computer implemented techniques that improve the operation of chatbot processing devices, such as chatbot computers, by using the disclosed knowledge graphs with cluster terms to improve the ability of the chatbot to address user questions, especially ambiguous questions. Cluster terms and linked documents may be automatically ranked to determine an order of presentation to a user by a chatbot based on semantic features of terms in a term cluster associated with a knowledge graph node, for example, so that the user's most likely intention can be automatically identified, and multiple options for responding to a user to a specific answer may be quickly narrowed.

Figure 1:
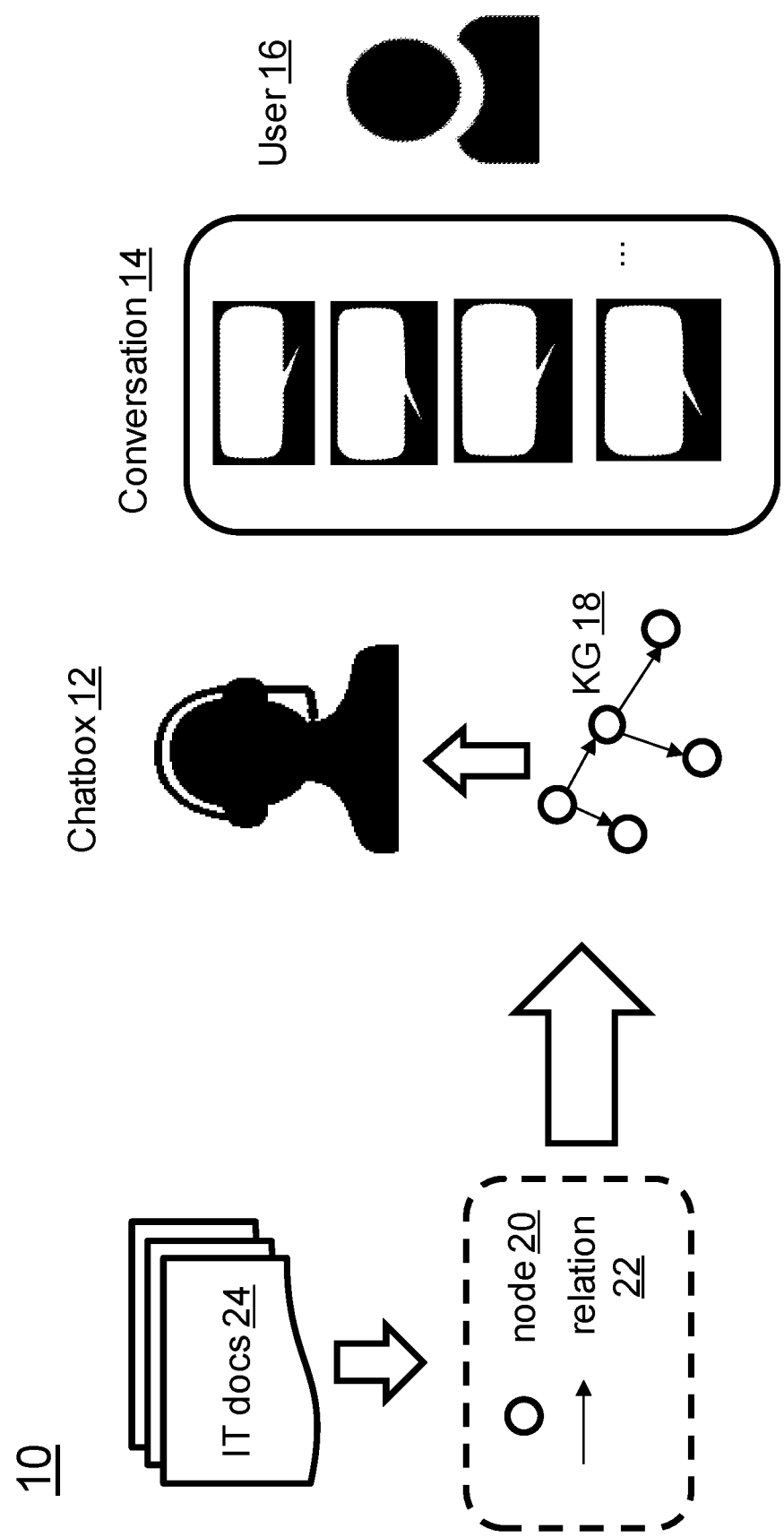
FIG. 1 is a schematic representation of an environment of an embodiment of the disclosure, where a chatbot has a conversation with a user based on a knowledge graph.

FIG. 1 is a schematic representation 10 of a chatbot 12 having a conversation 14 with a user 16 based on a knowledge graph 18. The knowledge graph 18 is generated by extracting nodes 20 and relationships 22 between nodes 20 from IT documents 24, which is the domain corpus in this example. IT documents 24 in this example may include product manuals and customer instructions for a respective product, for example, which are scanned for analysis. The words or terms acting as nodes 20 in the knowledge graph 18 may be nouns or noun phrases, for example. In some examples, the words and terms may also include verb phrases, for example. The documents in a domain corpus may be unstructured, which means that they do not include tags or labels that are sometimes used to facilitate creation of knowledge graphs. In the case of a structured domain corpus, which includes tags or labels, for example, a knowledge graph 28 may be generated based on the structured information, and then further enhanced in accordance with embodiments of the disclosure.

Figure 2:
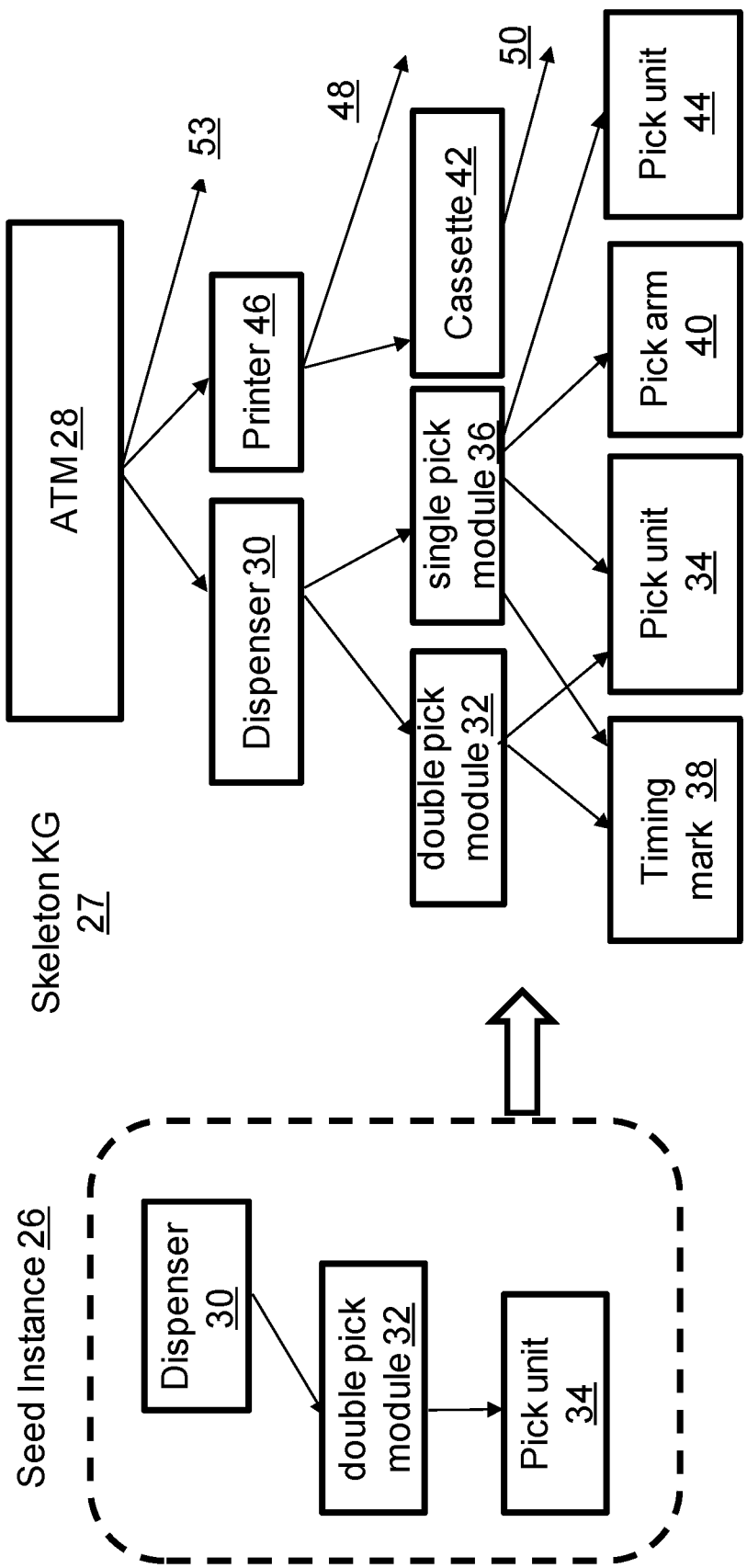
FIG. 2 is a schematic representation of a seed instance of a knowledge graph for an automated teller machine ("ATM").

FIG. 2 is a schematic representation of an example of a seed instance 26 and an example of a skeleton knowledge graph 27 for an automated teller machine ("ATM") 28. A seed instance is a portion of skeleton knowledge graph that assists in formation of the skeleton knowledge graph. The term "skeleton knowledge graph" is used herein to identify a knowledge graph without the augmentations, such as the term clusters, provided by embodiments of the disclosure. The seed instance 26 in this example includes as nodes a dispenser 30, a double pick module 32, and a pick unit 34 in a "component of relationship" (the dispenser 30 is a component of the ATM, the double pick module 32 is a component of the dispenser, and the pick unit 34 is a component of the double pick module). The seed instance 26 may be extracted from the IT documents 24 of FIG. 1 or may be provided by the ATM manufacturer or other entity that will use the skeleton knowledge graph 27 to interact with its customers, for example. Skeleton knowledge graphs generated based on a small amount of labelled data are referred to as being weakly supervised. Embodiments of the disclosure may also be applied to a pre-existing skeleton knowledge graph provided by an entity.

The nodes of the skeleton knowledge graph 27 for an ATM 28 are shown in rectangles. In addition to the nodes of the seed instance 26, a single pick module 36 is found to be a component of the dispenser 30 by analyzing the IT documents 24. A timing mark 38 and a pick unit 34 are similarly found to be components of the double pick module 32. A cassette 42 is also found to be a component of the dispenser 30. The timing mark 38 is also a component of the single pick module 36. Another primary component of the ATM found in the FT documents 24 is a printer 46. A cassette 42 is found to be a component of the printer 46. Arrow 48 represents components of the printer 46 that are not shown. Arrow 50 represents components of the cassette 42 that are not shown. Arrow 53 represents additional primary components of the ATM 28 that are not shown. The skeleton knowledge graph 27 is merely exemplary and does not limit embodiments of the disclosure.

Figure 3:
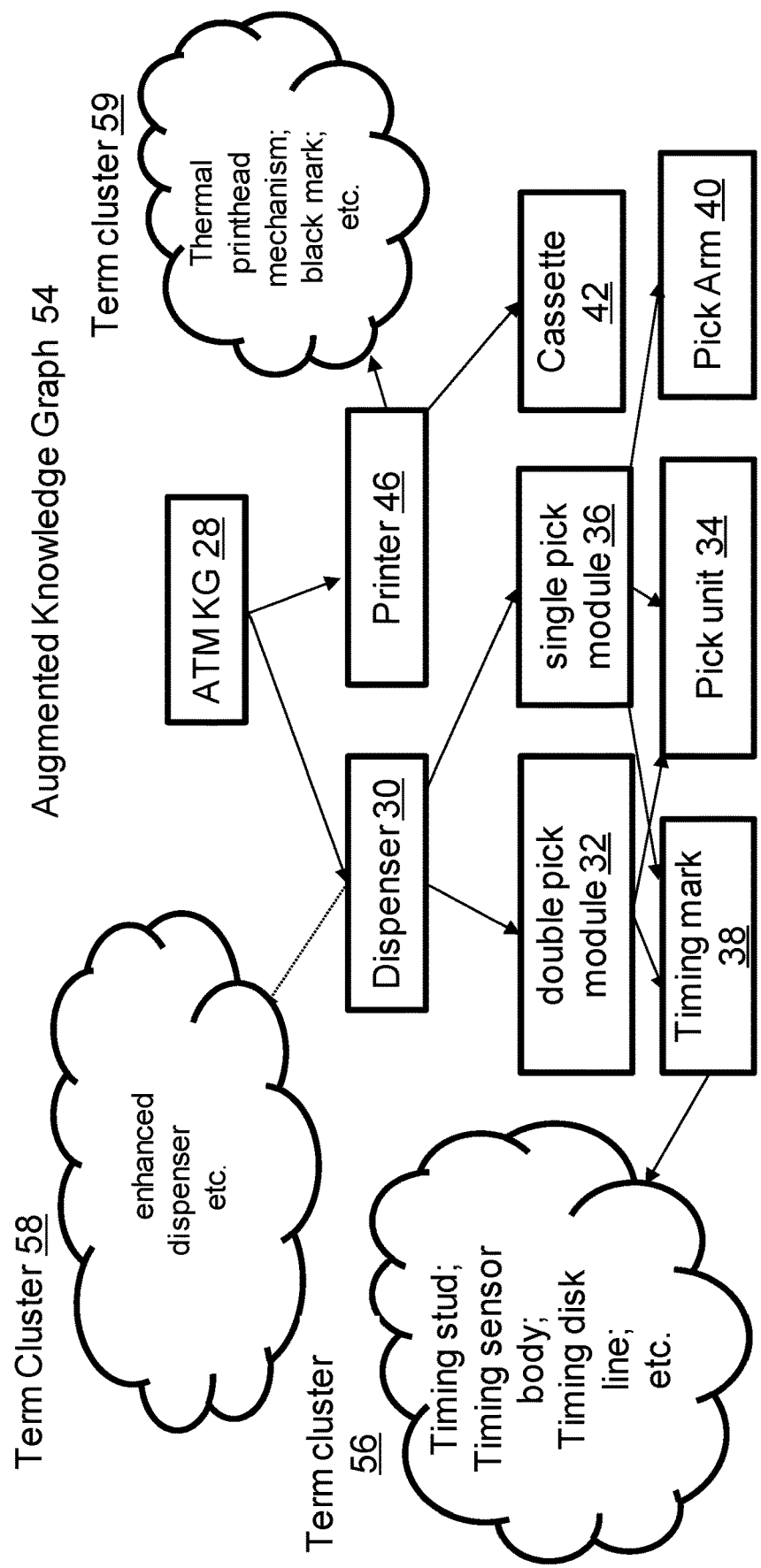
FIG. 3 is a schematic representation of an augmented knowledge graph, in accordance with an embodiment of the disclosure.

FIG. 3 is a schematic representation of an augmented knowledge graph 54 for an ATM 28 that is enhanced with respect to the skeleton knowledge graph 27 of FIG. 2, in accordance with an embodiment of the disclosure. Elements common to FIG. 1 and FIG. 2 are commonly numbered. The augmented knowledge graph 54 includes a portion of the skeleton knowledge graph 27 of FIG. 2, with a term cluster 56 associated or linked with the timing mark 38, a term cluster 58 associated or linked with the dispenser 30, and a term cluster 59 associated or linked with the printer 46. As used herein, the terms "associated" and "linked" as used with respect to the relationship between a node and its respective term cluster are synonymous. The term cluster 56 includes cluster terms timing stud, timing sensor body, and timing disk line that have been found in the domain corpus in association with the timing mark 38 but do not have a clearly defined relationship with the node or do not meet the relationship of the skeleton knowledge graph 27 because they are not components of the timing mark. The term clusters 58 and 59 include terms found associated with the dispenser 30 and the printer 46, respectively, but also not having a clearly defined relationship with the node or not meeting the relationship of the skeleton knowledge graph 27 because they are not components of the dispenser 30 or the printer 46. While in this example three term clusters 56, 58, 59 are shown associated with three respective nodes, in other examples, more nodes, fewer nodes, or all nodes may have associated term clusters, depending on whether there are terms associated with the nodes that do not qualify as nodes themselves, because their relationship with the node term is not clear or they do not meet the relationship or relationships represented in the skeleton knowledge graph 27, While the term clusters are shown in clouds adjacent the nodes they are associated or linked with, the term clusters and nodes of the augmented knowledge graph 54 may be stored in one or more tables in suitable storage, such as a database, for example. The database may be a relational database, for example. A database that may store augmented knowledge graphs is discussed below with respect to FIG. 5.

Figure 4:
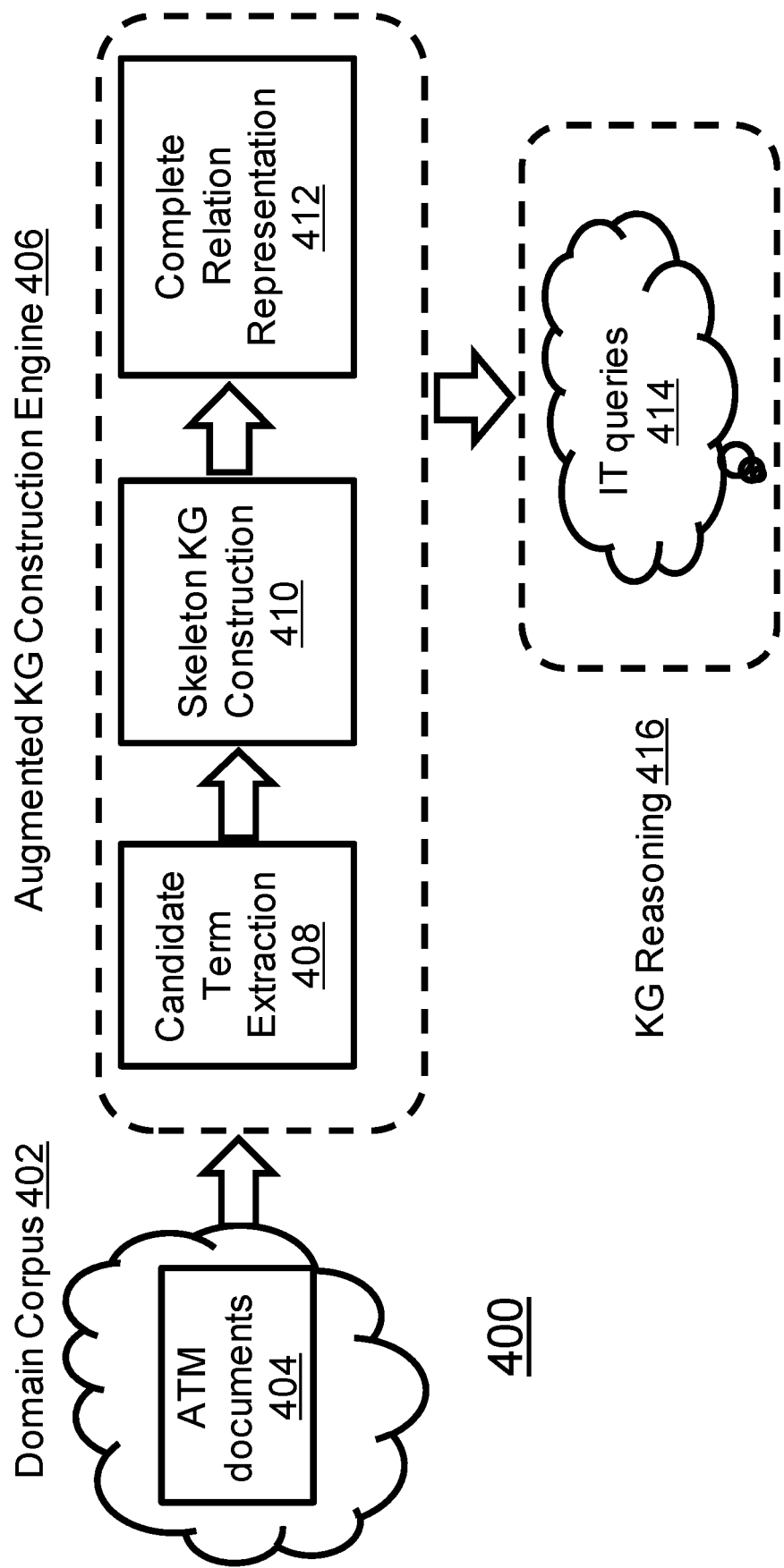
FIG. 4 is a block diagram of an example of a high-level schematic representation of a process for creating and using a knowledge graph with term clusters, in accordance with an embodiment of the disclosure.

FIG. 4 is a block diagram of an example of a high-level schematic representation of a process 400 for creating and using an augmented knowledge graph, such as the augmented knowledge graph 54 of FIG. 3, in accordance with an embodiment of the disclosure. A domain corpus 402 includes, in this example, ATM documents 404. ATM documents 404 in this example may include product manuals, instruction manuals, and the like related to the ATM 58 of FIG. 3. The documents may be unstructured and/or structured. While in this example the domain corpus contains ATM documents 404 and the constructed augmented knowledge graph is the augmented knowledge graph 54 of FIG. 3 for an ATM, the process 400 may be used to construct augmented knowledge graphs for different products and services by providing a different domain corpus with documents and/or other information related to the product or service of interest.

An augmented knowledge graph ("KG") construction engine 406 in this example includes a candidate term extraction block 408, which extracts words and terms for the knowledge graph from the domain corpus 402 A skeleton knowledge graph, such as the skeleton knowledge graph 27 of FIG. 2, for example, is generated from the candidate terms that meet the predetermined relationship or relationships of the skeleton knowledge graph, by the skeleton KG construction block 410. Construction of the skeleton knowledge graph may also be based, in part, on existing knowledge, such as a seed instance, as discussed above with respect to FIG. 2. A manufacturer or seller of a product or products covered by the knowledge graph, for example, may provide the seed instance or other information to assist in constructing the skeleton knowledge graph. While helpful, having a seed instance 26 is not required.

Terms, such as nouns and noun phrases, may be extracted from the domain corpus 402 of FIG. 4 for potential nodes in a skeleton knowledge graph by numerous techniques. For example, information retrieval techniques, such as entity extraction techniques and relation extraction techniques, may be used. Natural language processing, such as natural language understanding ("NLU") may be used. Watson NLU is an example of an NLU technique that may be used. Other entity extraction techniques that may be used include Stanford CoreNLP or spaCy, for example. Other methods include artificial intelligence, such as deep-learning models that learn from the labeled corpus and from general or domain specific language models, for example.

The skeleton knowledge graph 27 of FIG. 2 in this example is generated from the terms provided by existing knowledge and extracted from documents that meet the predetermined relationship or relationships between nodes based on basic relations also extracted from the domain corpus 402, in block 408. The predetermined relationship or relationships may be established by the entity for which the augmented knowledge graph is being prepared, for example. Basic relations are relatively explicit and have more occurrences in the documents than other relations. In the example of the skeleton knowledge graph 27 for the ATM 28 of FIG. 2, the relation is "component of," as discussed above. In other examples, the skeleton knowledge graph may be based on one or more other types of relationships in addition to or instead of "component of", such as "is a" (e.g., "a drive is a storage"), "manufacturer of," "symptom-remediation-solution," "software-runs on-product," "hardware-tune up-performance indicator," or "software-configuration-config parameter/feature", for example.

Relations may be extracted from available documents by numerous techniques. For example, information retrieval techniques may be used. Natural language processing ("NLP") techniques, such as embedding based methods may be used, for example. Word2vec may be used, for example. Artificial intelligence, such as such as deep-learning models that learn from the labeled corpus and from general or domain specific language models, may also be used, for example. Distributional representation, which is another example of a term embedding technique, may also be used to extract the relations from the domain corpus 402.

The skeleton KG construction block 410 may further use taxonomy expansion by hierarchical tree expansion, which is based on embedding. In taxonomy expansion based on embedding, a seed taxonomy, such as the seed instance 26 of FIG. 2, or an earlier version of the skeleton knowledge graph 27 built by block 410 of FIG. 4, for example, is used as task guidance. Additional key terms are extracted from the text of the domain corpus 402, here the ATM documents 404, and the taxonomy is generated automatically by width expansion and depth expansion. In width expansion, the skeleton is increased based on the similarity of terms (embeddings, etc.) in the skeleton and the domain corpus. In depth expansion, the skeleton is increased based on relation extraction, where the offset of the embeddings of two terms can represent the relationship between them. The resulting skeleton knowledge graph 27 of FIG. 2 is output from block 410 and provided to the complete relation representation block 412 of FIG. 4.

Complete relation representation is performed in block 412 to identify additional terms, including single words or phrases, that are found in association with terms in the nodes of the skeleton knowledge graph but have an unclear relation to a term in the node or do not clearly meet the relationship defined by the skeleton knowledge graph, such as being a component of the node or the other relationships described above, for example. Such terms, which may also be extracted by the candidate term extraction block 408 or by the complete relation representation 412 block, are placed in groups of such terms referred to as term clusters, including the term clusters 56, 58, 59 of the augmented knowledge graph 54 of FIG. 3. In this example, a term that is used with the term of the node but is not a component of the node may be a candidate for the term cluster. The terms may be strongly associated, for example. Association may be measured by a co-occurrence analysis method, such as pointwise mutual information ("PMI"), for example, which is a common measure of the strength of association between two terms in a sentence. For a target term A, such as a node term, the PMI regard term B is calculated based on a number of the instances of co-occurrence of terms A and B in a sentence of a document divided by the total occurrence of term A in the document. Then the PMI of term A with all terms in the document is calculated and the top K terms or terms having PMIs greater than a threshold are selected as being strongly associated terms with term A. K or the threshold may be based on experimentation and/or a machine learning model, for example. Other techniques that measure co-occurrences of terms in a sentence or document may also be used.

The top K terms and/or the terms having a PMI with respect to a node that is above a threshold, for example, may be placed in the term cluster. In the example of the ATM skeleton knowledge graph 27 of FIG. 2, it is found that the noun terms timing stud, timing sensor body, and timing disk line, for example, is associated with the term/node timing mark in the domain corpus 402, but it might not be clear from the ATM documents 404 that these items are components of the timing mark.

The complete relation representation block 412 may also use semantic features, such as semantic dependency, to represent complex relations between nodes and cluster terms. Complex relations are relations in a domain that have not been clearly extracted or have not been defined in previous knowledge graphs that might be available to use as a reference. Semantic dependency parsing, such as shortest dependency path ("SDP"), may be used to identify cluster terms based on semantic features, for example. SDP in a dependency parse tree carries strong information about the relation between two terms. Two sets of features of a sentence are used to represent a relation for each pair of associated terms. An example of a semantic feature that may be used in embodiments of the disclosure is a frequent event word in a sentence or phrase. Another example of a semantic feature that may be used in embodiments of the disclosure is a frequent pattern in the sentence or phrase, for example. In the portion of the sentence " . . . check that the timing mark on the lower drive cluster timing disk lines up the timing sensor body . . . ," a frequent event word or term is "lines up." Frequent dependency path patterns in the sentence include the prepositions "on" and "with."

Figure 5:
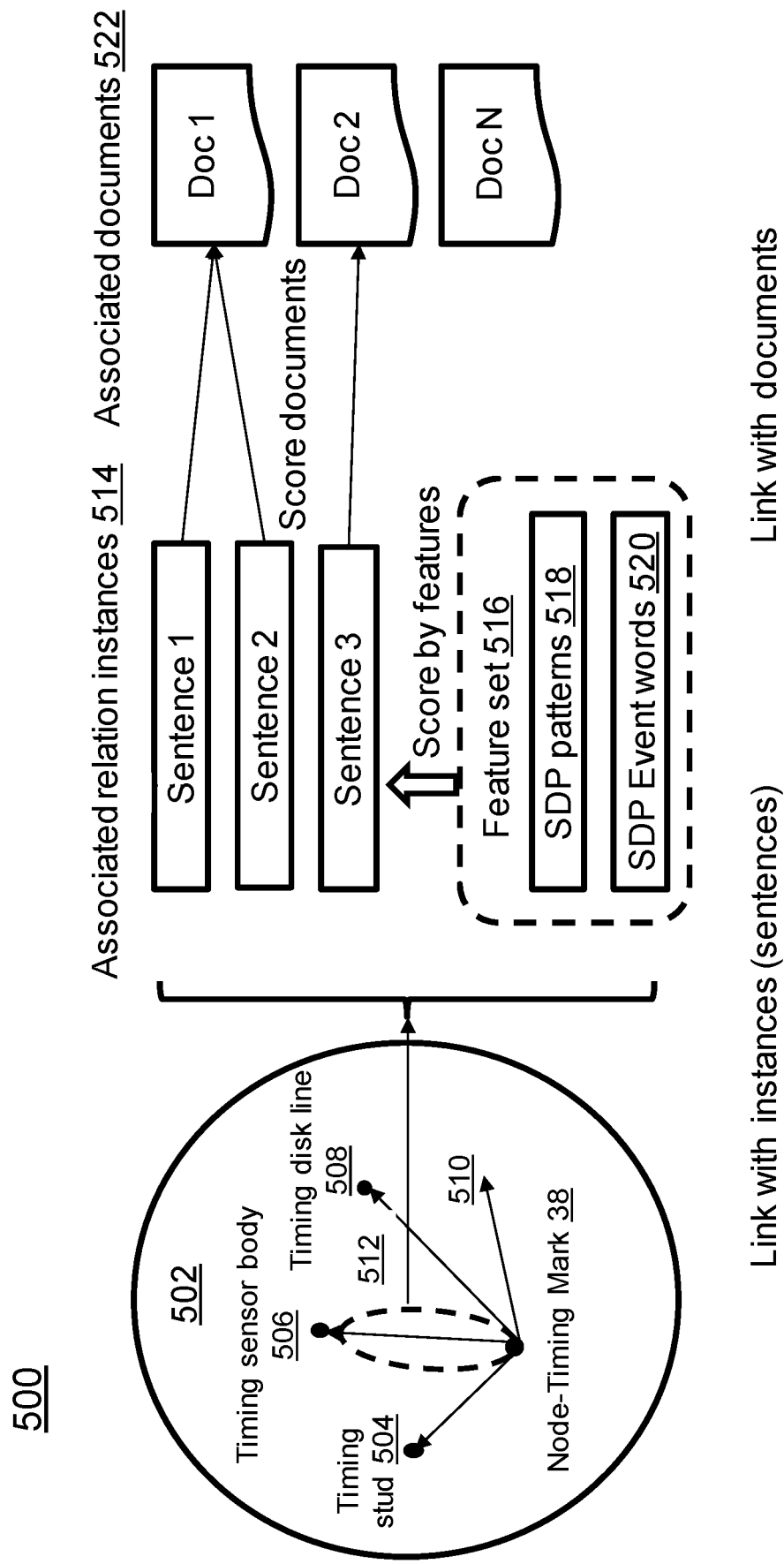
FIG. 5 is a schematic representation of additional information that can be incorporated in the term clusters in the knowledge graph, in accordance with an embodiment of the disclosure.

FIG. 5 is a schematic representation of additional information 500 that may be incorporated in and linked to the term clusters in the augmented knowledge graph 54 of FIG. 3 by the complete relation representation block 412. A grouping 502 including the timing mark node 38 of the augmented knowledge graph 54 of FIG. 3, and terms in the associated term cluster 56 of FIG. 3, here timing stud 504, timing sensor body 506, timing disk line 508, and an arrow 510 indicating other terms in the term cluster, is shown. The node-cluster term pair 512 of the timing mark 38 and the timing sensor body 104, for example, is linked to the associated relation instances or sentences 514, here sentence 1, sentence 2, sentence 3, from which the associations were derived, as discussed above. A relation instance may also be a phrase, for example. A feature set 516 including the SDP frequent event patterns 518 and the SDP event words 520 in the associated relation instances 514 that represent the relation between the node-cluster term pair 512 are also linked to the node-cluster term pair, to show the semantic features that formed the basis of the node-cluster term pair 512. The associated relation instances 514 are also linked to the associated documents 522, in which sentence 1, sentence 2, and sentence 3 appear. In this example, sentence 1 and sentence 2 are from document 1, and sentence 3 is from document 2 of the domain corpus 402, for example. Document N represents additional documents in the domain corpus 402 in FIG. 4. Some or all of the associated relation instances 514 and associated documents 522 may be provided to the user in response to a question.

A scoring function may be developed by the complete relation representation block 412 based on the feature set 516 to better respond to user questions. If a node-cluster term pair appears in many relation instances, some may be noise because the node-cluster term appears together but express no relation. To determine whether a relation instance including the node-cluster term is noise or not, the feature set 516 may be analyzed to characterize the instance based on the frequent semantic patterns in the feature set. The instances may be scored based on the feature set to rank the instances in later steps of the process, as discussed below. The scores are referred to as base scores below. Higher ranked sentences may be provided to a user 16 by the chatbot 12 (see FIG. 1) in response to a question before lower ranked sentences, as discussed below. Scores may be compared to a threshold to determine more or less relevant instances. Thresholds may be determined by experimentation and/or a machine learning model, for example.

The associated documents 522 are also scored, based on the scores of the relation instances in the respective document. Passages, or groups of consecutive relation instances in the documents may also be scored based on the scores of each instance. The scores of respective relation instances in a respective document may be summed to get the score of a document and the documents may be ranked based on the scores to rank the documents in later steps of the process. Higher ranked documents may be provided to a user 16 by the chatbot 12 (see FIG. 1), in response to a question.

It is noted that in some embodiments of the disclosure, an existing, complete skeleton knowledge graph, such as the skeleton knowledge graph 27, in this example, may be provided to the augmented KG construction engine 406 for enhancement by cluster terms and optionally additional information. In that case, the candidate extraction block 408 or the complete relation representation block 412 would extract terms associated with the nodes of the skeleton knowledge graph for further analysis by the complete relation representation block 412 to identify the cluster terms and optionally the additional information to construct an augmented knowledge graph 54 of FIG. 3, and the skeleton knowledge graph construction block 410 of FIG. 4 would not be used.

Use of an augmented knowledge graph, such as the augmented knowledge graph 54 of FIG. 3, to respond to user's queries 414 is handled by a KG reasoning block 416 in FIG. 4. While the example of the augmented knowledge graph 54 will be referred to in the following discussion, it should be understood that embodiments of the disclosure are not limited to an augmented knowledge graph 54 for an ATM or an augmented knowledge graph related to any other particular product or service. In one embodiment of the disclosure, functions of the KG reasoning block 416 are implemented by a knowledge graph engine hosted on a knowledge graph server, which communicates with a chatbot across a network, as discussed below with respect to FIG. 6. In another embodiment, functions of the KG reasoning block 416 may be implemented by the chatbot, such as the chatbot 12 of FIG. 1. In either case, if a question is clear, the nodes of the augmented knowledge graph 54 of FIG. 3, may be used to answer the question. A clear question is one where the query includes a term matching a node in the augmented knowledge graph 54 that does not have multiple parents so that there is a unique path along the knowledge graph from a parent to a node or nodes including the query term, and the node is a node the user is most interested in because the user is not interested in a child node connected to the node including the query term. A query may also not be clear because it uses terms in nodes in a way not consistent with the relationship(s) of the augmented knowledge graph 54.

If a node or nodes of the augmented knowledge graph 54 of FIG. 3 corresponding to the query term has multiple parents and one or more related child nodes in the augmented knowledge graph 54, the query is considered to be ambiguous and the chatbot 12 presents questions to the user 16 to focus the query by asking the user questions such as "Do you mean . . . ," based on the parent and child nodes. The number of levels of parent and child nodes that may be checked may be set based on the size of the augmented knowledge graph, for example. If the user 16 agrees that the user is interested in a node along a unique path from a parent to the node, then the query is resolved based on the nodes of the augmented knowledge graph 54. If a query does not include a term in a node, the chatbot 12 may present questions based on the nodes of the augmented knowledge graph 54 to attempt to identify a node of interest.

If it is determined that the user 16 is not satisfied with the node terms of the augmented knowledge graph 54 presented by the chatbot 12 and/or a unique path from a parent to a node cannot be identified, then the user is given the option to select a term in a term cluster of the augmented knowledge graph 54, such as the term clusters 56, 58, 59 in FIG. 3, associated with a nodes of the augmented knowledge graph 54, as described in more detail below. The associated relation instances in FIG. 5 may further assist in driving the conversation and clarifying the question.

FIG. 6 is a block diagram of an example of a system 600 that is configured to construct or generate an augmented knowledge graph and to conduct a conversation with a user 602 by a chatbot 604 via a user device 605 based on the augmented knowledge graph, such as the augmented knowledge graph 54 of FIG. 3, in accordance with an embodiment of the disclosure. As above, in the following discussion, the augmented knowledge graph 54 of FIG. 3 will be referred to, but it should be understood that embodiments of the disclosure are not limited to the augmented knowledge graph 54. Today, user devices 605 typically take the form of portable handsets, smart-phones, tablet computers, personal digital assistants (PDAs), and smart watches, although they may be implemented in other form factors, including consumer, medical, and business electronic devices, for example. A chatbot App may optionally be provided on the user device 605 to facilitate communication with the chatbot 604 and/or other components of the system 600, for example. In another example the user device 605 may communicate with a web browser, for example.

The chatbot 604 may be or include a computer 606, for example, configured to receive verbal and/or written queries from the user and to drive conversations with the user based on an augmented knowledge graph in order to provide the user with the requested information. A domain corpus database 608 stores the documents and optionally other information about one product or respective products that a user may ask about. Knowledge graph server 610 includes a knowledge graph engine 612 to generate the augmented knowledge graph. In one embodiment, the knowledge graph engine 612 performs the functions of the augmented KG construction engine 406 and KG reasoning of the block 416 of FIG. 4. In another example a separate KG reasoning engine may be provided on the knowledge graph server 610. In another embodiment, the functions of the KG reasoning block 416 of FIG. 4 may be performed by the computer 606 of the chatbot 604, for example. In yet another example, the knowledge graph engine 612 may communicate with the user device 605 directly, via an App, or via a web browser, for example.

The knowledge graph engine 612 may cause storage of the augmented knowledge graph(s) with cluster terms generated by the knowledge graph engine 612 in a knowledge graph database 614. The knowledge graph database 614 may store one augmented knowledge graph for one product or service of an entity or multiple augmented knowledge graphs for multiple products and/or services of the entity in a table, for example. The database may be a relational database, for example. Alternatively, the augmented knowledge graph(s) may be stored in or associated with the knowledge graph server 610 or knowledge graph engine 612. In another alternative, the augmented knowledge graph(s) may be stored in the domain corpus database 608.

A network 616 allows the knowledge graph server 610 to communicate with various resources connected to the network 160, such as the domain corpus database 608, the knowledge graph database 614, and the chatbot 604. The knowledge graph engine 612 retrieves the appropriate documents from the domain corpus database 608 to generate an augmented knowledge graph for a respective product or service, for example, in accordance with embodiments of the disclosure, and stores the generated augmented knowledge graph in the knowledge graph database 614. In one embodiment, the knowledge graph engine 616 also receives queries from the chatbot 604 over the network 616 and instructs the chatbot in how to respond to the query based on the generated augmented knowledge graph, such as the augmented knowledge graph 54 of FIG. 3. In addition, the knowledge graph engine 612 retrieves documents, sentences, and passages from the knowledge graph database 614 and provides them to the chatbot 604, which provides them to the user 602 in response to queries. Phrases may also be retrieved.

In another embodiment, the knowledge graph engine 612 provides the generated augmented knowledge graphs, such as the augmented knowledge graph 54 of FIG. 3, across the network 616 to the chatbot 602, which stores the augmented knowledge graph and uses the augmented knowledge graph to drive the conversation with the user 602 via the computer 606. In this embodiment, the chatbot 602 can access documents, phrases, sentences, and passages from the domain corpus database 608, across the network 616, or request them from the knowledge graph engine 612. In another embodiment, the chatbot 602 accesses and uses the augmented knowledge graph 54 across the network 616. Whether to implement a centralized architecture, where knowledge graph reasoning (block 416 of FIG. 4), is conducted by the knowledge graph engine 612 to instruct the chatbot 604 how to respond to queries, or to various degrees of distribution of content and functionality, where the augmented knowledge graph 54 is provided to the chatbot 604, which conducts knowledge graph reasoning, for example, depends on the scale of content of the skeleton knowledge graph portion of the augmented knowledge graph 54, the term clusters, the additional information, and latency requirements, for example. The augmented knowledge graph 54 of FIG. 3 could also be split between a local application on the chatbot 604 and a remote component, depending on the frequency of access by users and response time constraints, for example.

The network 616 may be a local area network ("LAN"), a virtual private network ("VPN"), a cellular network, the Internet, or a combination thereof, for example. The network 616 may include a mobile network that is communicatively coupled to a private network, sometimes referred to as an intranet, that provides various ancillary services, such as communication with various application stores, libraries, the Internet, and the cloud 618.

While the knowledge graph domain database 608 is shown separate from the knowledge graph database 614, the two databases could be combined. In addition, the knowledge graph domain database 608, the knowledge graph server 610, and the knowledge graph database 614 may be implemented by virtual computing devices in the form of virtual machines or software containers that are hosted in the cloud 618, thereby providing an elastic architecture for processing and storage. The cloud 618 is discussed in more detail below.

Example Processes for Using Knowledge Graph

Figure 7A:
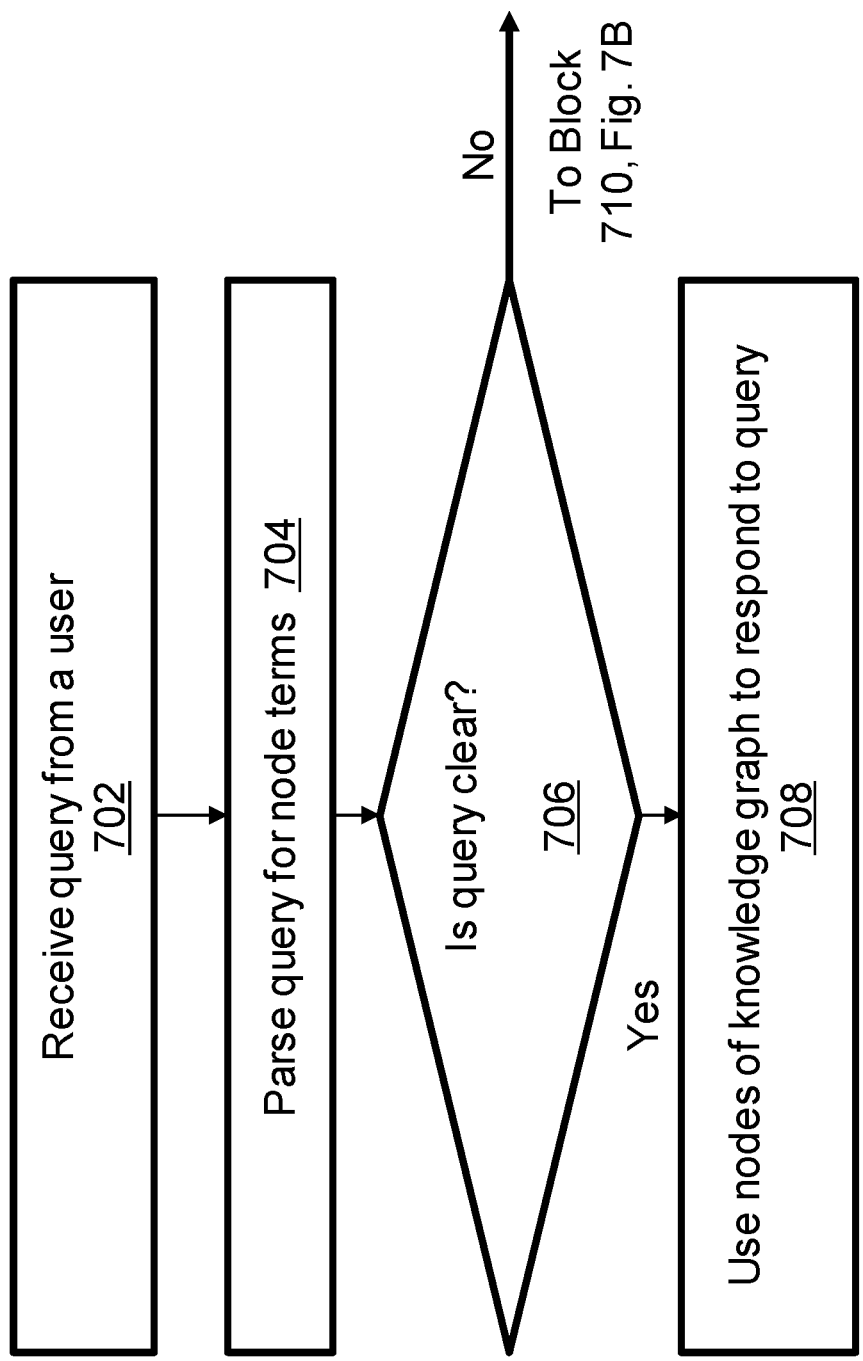
Figure 7B:
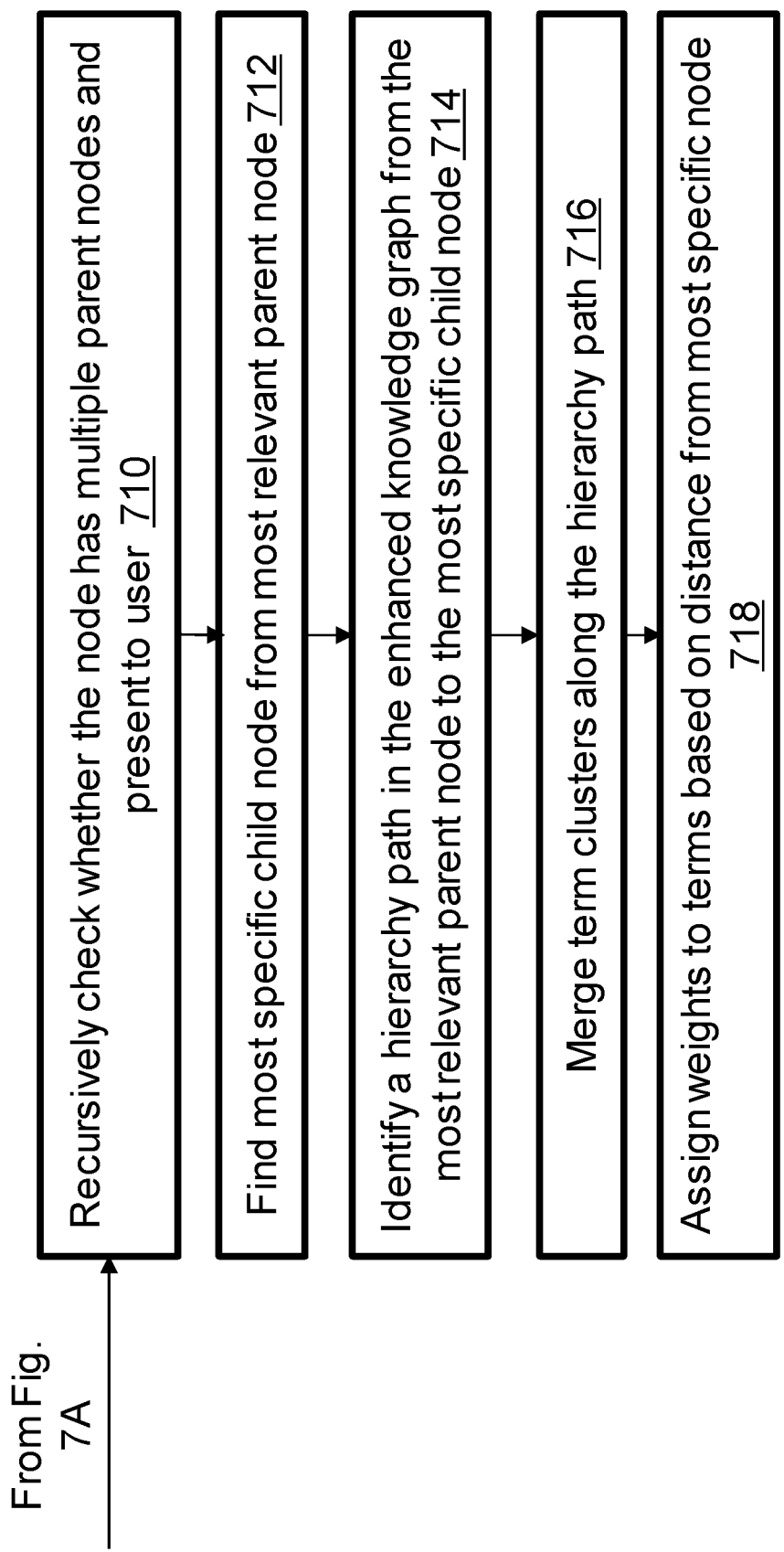

An example of a process for responding to an ambiguous question that cannot be resolved with only the nodes of an augmented knowledge graph in accordance with embodiments of the disclosure, is discussed with respect to FIGS. 7A, 7B, and 8. As above, in the discussion of FIGS. 7A, 7B, and 8, the augmented knowledge graph 54 will be referred to but it should be understood that embodiments of the disclosure are not limited to the augmented knowledge graph 54. When a question cannot be narrowed down to a unique path between terms in the nodes with subsequent questioning, or in which terms are used in a way that is not consistent with the augmented knowledge graph, responding to the question in accordance with embodiments of the disclosure, involves two stages: 1) disambiguation along the nodes of an augmented knowledge graph to find the most specific component that the user 16 is interested in; and 2) reasoning in the cluster term(s) of the augmented knowledge graph to find other strongly associated terms or actions the user is possibly interested in, for example. The two steps may be combined in a single process.

FIGS. 7A, 7B, and 8 are examples of processes for using augmented knowledge graphs in accordance with embodiments of the disclosure. It will be understood that each block of the flowchart illustrations and/or block diagrams, and combinations of blocks in the call flow illustrations and/or block diagrams, can be implemented in hardware, software, or a combination thereof. In the context of software, the processes represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described processes can be combined in any order and/or performed in parallel to implement the process.

FIG. 7A and FIG. 7B show a flowchart 700 of an example of stage 1 of the use of an augmented knowledge graph (disambiguation along the skeleton to find the most specific component that the user 16 is interested in), such as the augmented knowledge graph 54 of FIG. 3, in accordance with an embodiment of the disclosure. While in the explanation below the knowledge graph engine 612 performs the operations of the flowchart 700, as described herein, the operations of the flowchart 700 may also be performed by the chatbot computer 606 or the operations may be split between the knowledge graph engine 612 and the chatbot computer 606, for example.

A query is received by the chatbot 604 from the user 602 and provided to the knowledge graph engine 612 across the network 616, in block 702. The query is parsed for node terms of the augmented knowledge graph 54 of FIG. 3, in this example, by the knowledge graph engine 612, in block 704. It is determined whether the query is clear, in block 706. The knowledge graph engine 612 may determine whether the query is clear by determining whether a term in the query is a term in a node of the augmented knowledge graph 54 along a unique path, as discussed above, for example. Block 706 may include attempts to clarify the query by prompting the user 602 with questions related to terms in the nodes of the augmented knowledge graph 54, in order to identify a unique path and determine whether the user is interested in child nodes. If the query is clear or resolved to be clear by questioning (Yes in block 706), then the query is not ambiguous and the chatbot 604 answers the query using the nodes of the augmented knowledge graph 54, in block 708.

If it is determined by the knowledge graph engine 612 that the query is not clear, even after attempts to clarify the query by questioning (No in block 706), it is determined that the query is ambiguous and the process 700 proceeds to block 710 of FIG. 7B. It may be determined that a query is ambiguous after questioning the user with each parent and child node along a path with the node in the query without identifying a unique path, for example. The knowledge graph engine 612 recursively checks whether the located node in the query has one or more parent nodes and presents the parent node(s) to the user for the user to identify the most relevant parent node, in block 710. The number of levels of parent and child nodes that may be checked may be set based on the size of the augmented knowledge graph, for example. It is noted that the knowledge graph engine 612 may perform this operation in whole or in part in block 706 while attempting to determine whether the query is clear. The number of levels checked in block 710 may be the same or different than the number of levels checked in block 706. The number of levels to be checked in block 706 and in block 710 may be determined by experimentation and/or a machine learning model, for example.

The knowledge graph engine 612 also asks the user 602 about child nodes of node in the query to identify the most relevant child node, in block 712. By presenting the parent nodes and the child nodes to the user in questions such as, "Do you mean . . . ," the knowledge graph engine 612 can focus in on the information the user 12 is calling about. Referring to the augmented knowledge graph 54 of FIG. 3, in this example, if the user asks about the single pick module 36 in an ambiguous way in the question, the knowledge graph engine 612 could instruct the chatbot 604 to ask about the dispenser 30, which is a parent of the single pick module. If the user responds positively, the knowledge graph engine 612 could instruct the chatbot 604 to ask about the double pick module 32, which is another child of the dispenser 30. If the chatbot 604 receives a positive response to a question about the double pick module 32, the chatbot could be further instructed to can ask about the timing mark 38 and the pick unit 34. The user 602 could respond with interest in the timing mark 38, and then the dispenser 30, the double pick module 32, and the timing mark 38 would provide a unique path.

In another example, in the augmented knowledge graph 54 of FIG. 3, if the user 602 asks about the single pick module 36 and the timing mark 38 in the query, which are not along a unique path, the chatbot 604 could be instructed by the knowledge graph engine 612 to ask about the dispenser 30, which is a parent of the single pick module, and then could ask about the double pick module 32, which is another child of the dispenser 32. If the chatbot 604 receives a positive response, the knowledge graph engine 612 could instruct the chatbot 602 to further ask about the timing mark 38, which in this example could be closer to what the user 16 is calling about. If the user 602 indicates that the user has the most interest in timing mark 38, the dispenser 30, the double pick module 32, and the timing mark 38 form a unique path in the augmented knowledge graph 54, which the single pick module 36 and the timing mark 38 do not.

A hierarchy path is identified in the augmented knowledge graph 54 in this example from the most relevant parent node that the user identifies to the most specific node that the user identifies, by the knowledge graph engine 612, in block 714. The most specific node may be a child node. In the two examples discussed above, the most relevant parent node is the dispenser 30, the most specific child node is the timing mark 38, and the hierarchy path includes the dispenser, the double pick module 32, and the timing mark FIG. 3.

Term clusters along the hierarchy path may be merged with the hierarchy path, in block 716. Continuing with the discussion with respect to the augmented knowledge graph 54 of FIG. 3, in this example, the term cluster 56, which is associated with the timing mark node 38, is merged or combined with the cluster terms associated with the other nodes along the hierarchy path. As shown in FIG. 3, the dispenser 30 has an associated term cluster 58, which is also merged with the hierarchy path. Term clusters along a hierarchy path are merged with the terms of the hierarchy path because it is possible that a term cluster associated with a node other than the most specific node within the hierarchy path could be more relevant to the query than the cluster term associated with the child or most node.

Weights are assigned to the terms in the term cluster 58 and other term clusters in the hierarchy path, by the knowledge graph engine 612, in block 718. The weights are assigned based on their distance from the most specific node in steps along the knowledge graph, so the cluster terms in the term cluster 56, for example, receive a higher weight than the cluster terms in the term cluster 58, which are farther from the timing mark node 38. The weights are used in reranking of the cluster terms in later blocks.

FIG. 8 is a flow chart 800 of an example of stage 2 (reasoning in a cluster term to find other strongly associated terms or actions the user is possibly interested in). While in the explanation below the knowledge graph engine 612 performs the operations of the flowchart 800, as described above, the operations of the flowchart 800 may also be performed by the chatbot computer 606 or the operations of the flowchart 800 may be split between the knowledge graph engine 612 and the chatbot computer 606, for example.

Term pairs are identified between the node term and each term in the term cluster, and merged term cluster if term clusters are merged, by the knowledge graph engine 612, in block 802. Continuing with the discussion of the augmented knowledge graph 54 of FIG. 3, in this example, each cluster term in the term cluster 56 (timing stud 504, timing sensor body 506, and timing disk line 508) (see FIG. 3 and FIG. 5) is paired with the timing mark 38. Terms in a term cluster area also referred to as a cluster terms.

The documents previously linked to each node-term pair, as discussed above with respect to FIG. 5, are ranked to determine the likelihood that a respective document will be responsive to the query, in block 804. The ranking indicates which documents are used in the right context. Documents may be ranked based on: 1) their base score from when the term cluster was constructed, as discussed above with respect to FIG. 5; 2) the hierarchy information (the distance along the path, as discussed above with respect to block 718); and/or 3) the number of SDP event words in the document related to the query (the documents including more event words related to the query are ranked higher), for example. Weightings may be applied to each of the factors above so that documents more relevant to the query are ranked higher than less relevant documents. Documents having higher base scores, documents closer to the node of interest in the hierarchy path, and documents including relation instances with more SDP event words than other documents are ranked higher. The actual weightings may be based on experimentation, for example. A machine learning model may be used to facilitate the selection of the weightings. The weightings are used to assign a final score to the documents, which are used to rank the documents. Documents previously linked to the node-term pairs including merged cluster terms may be similarly weighted.

The terms in the term cluster are ranked to determine the likelihood that a respective term is relevant to and therefore responsive to the query, in block 806. Merged cluster terms may also be ranked for presentation to the user along with the terms in the linked term cluster. Ranking of the cluster terms for a respective query may be based on: 1) hierarchy information; 2) the event words in the query; and/or 3) the discriminative power of the choice, for example. Here, the hierarchy information is used to rank cluster terms by determining the relation of the documents associated with a respective cluster term-node term pair to the hierarchy path, so that a term pair with higher ranked documents is ranked higher. Cluster term-node term pairs that have associated frequent event word sets that match the event words in the query receive higher weightings than those with fewer matches. The discriminative power of the choice refers to the number of documents associated with a cluster term-node term pair. Since a user would rather receive one or a few documents in response to a query than a larger number of documents, the cluster term-node term pairs may be ranked based on the number of associated documents. Cluster term-node term pairs associated with a smaller set of documents may be ranked higher than those associated with a larger number of documents. As above, weightings are applied to each of the factors, based on experimentation and/or a machine learning model, for example, in order to generate an ordered list of cluster terms in the order of relevancy, or otherwise rank the cluster terms.

Weightings may be applied to each of the factors above. The weightings may be based on experimentation, for example. A machine learning model may facilitate the selection of the weightings. Cluster terms are prompted to the user in the order of the overall ranking, in block 808. When the user selects the most relevant cluster term, the documents linked to the cluster term node term pair may also be presented to the user in the order of ranking in response to the user's inquiry, in block 810. While documents are referred to in FIG. 8, relation instances (sentences), phrases, and passages may also be provided. It should be understood that when used in the context of providing documents to a user, the term document also encompasses relation instances (sentences), phrases, and passages.

Another factor that may be used to rank cluster terms is feedback provided by users. If over time users show a preference to certain terms in a term cluster over others, that feedback may be used to prioritize those terms over others in the term cluster. Feedback may be weighted and considered along with one or more of the other factors contributing to the ranking of cluster terms. Experimentation may be used to determine the weighting and a machine learning model may be used to facilitate selection of the weighting of the feedback, for example. Strong feedback could result in moving a cluster term from a cluster and adding it to the augmented knowledge graph as a node. For example, referring to the augmented knowledge graph 54 of FIG. 3, if users tend to select the timing stud more than the other terms in term cluster 56, the timing stud could be made a child node of the timing mark 36. A threshold may be established to determine the number of positive selections that justify creating a node from a cluster term based on experimentation and optionally a machine learning model, for example.

Figure 9:
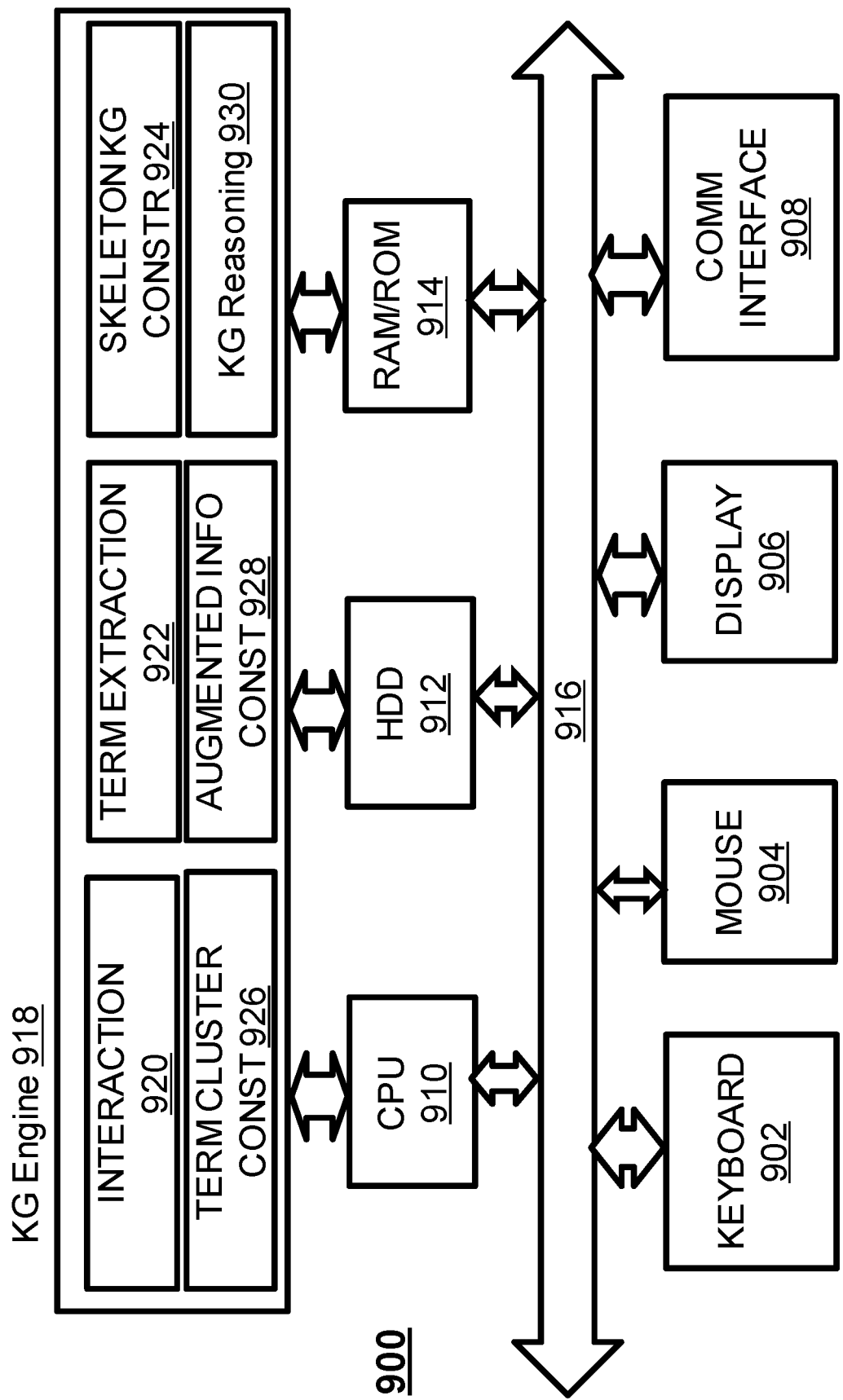
FIG. 9 is an example of a functional block diagram of a computer hardware platform, such as a network or host computer platform, that may be used to implement an appropriately configured server, such as the knowledge graph server of FIG. 6.

Functions relating to the generation of augmented knowledge graphs in accordance with embodiments of the disclosure may be performed with the use of one or more computing devices connected for data communication via wireless or wired communication, for example. FIG. 9 is an example of a functional block diagram of a computer hardware platform 900, such as a network or host computer platform, that may be used to implement an appropriately configured server, such as the knowledge graph server 610 of FIG. 6. Other configurations may be used instead.

The computer platform 900 may include a processing device, such as a central processing unit (CPU) 910, a hard disk drive ("HDD") 912, and random access memory ("RAM") and read only memory ("ROM") 914, which are connected to a system bus 916. A keyboard 902, a mouse 904, a display 906, and/or a communication interface 908, may also be connected to a system bus 916, for example.

A knowledge graph engine program 918, which corresponds to the knowledge graph engine 612 of FIG. 5, can execute various processes in a manner described herein. The knowledge graph engine program 918 may be stored in a non-transitory computer readable storage medium, such as the HDD 904, for example.

The knowledge graph engine 912 may have various modules configured to perform different functions. The modules in the knowledge graph engine 912 may be hardware, software, or a combination of hardware and software, for example.

There may be an interaction module 920 that is operative to receive electronic data from various sources, such as the domain corpus 608, the knowledge graph database 614, and the chatbot 604, for example. 614. The interaction module 920 is also operative to send electronic data, such as augmented knowledge graphs, to various locations, such as the knowledge graph database 614, for storage.

A term extraction module 922 performs the operations of the candidate term extraction block 408 in the example of FIG. 4, described above, to retrieve terms from the domain corpus 608 for the skeleton knowledge graph and the cluster terms of the augmented knowledge graph in accordance with embodiments described herein. A skeleton knowledge graph construction module 924 performs the operations of the skeleton knowledge construction block 410, described above, to construct or generate the skeleton knowledge graph. A term cluster construction module 926 performs the operations described above with respect to block 412 of FIG. 4, and an augmented information construction module 928 performs the operations described above with respect to the complete relation representation block 412 of FIG. 4 and FIG. 5, for example. A knowledge graph reasoning module 930 performs the functions of the knowledge graph reasoning block 414, FIG. 7A, FIG. 7B, and FIG. 8 described above.

The chatbot computer 604 may have a similar structure as the computer platform 900, for example, and the chatbot computer 606 may include an engine configured to conduct a conversation with a user 16 based on an augmented knowledge graph, in the manner described herein. If the chatbot computer 606 is to perform KG reasoning as in block 414 of FIG. 3 and FIGS. 7A, 7B, and 8, then it could also include a module corresponding to the knowledge graph reasoning block 930 shown in FIG. 9, for example.

A program, such as Apache™, can be stored for operating the system as a Web server. In one embodiment, the HDD 174 can store an executing application that includes one or more library software modules, such as those for the Java™ Runtime Environment program for realizing a JVM (Java™ virtual machine).

Example Cloud Platform

As discussed above, functions relating to generating an augmented knowledge graph and conducting reasoning with the augmented knowledge graph may include a cloud 618, as shown in FIG. 6. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
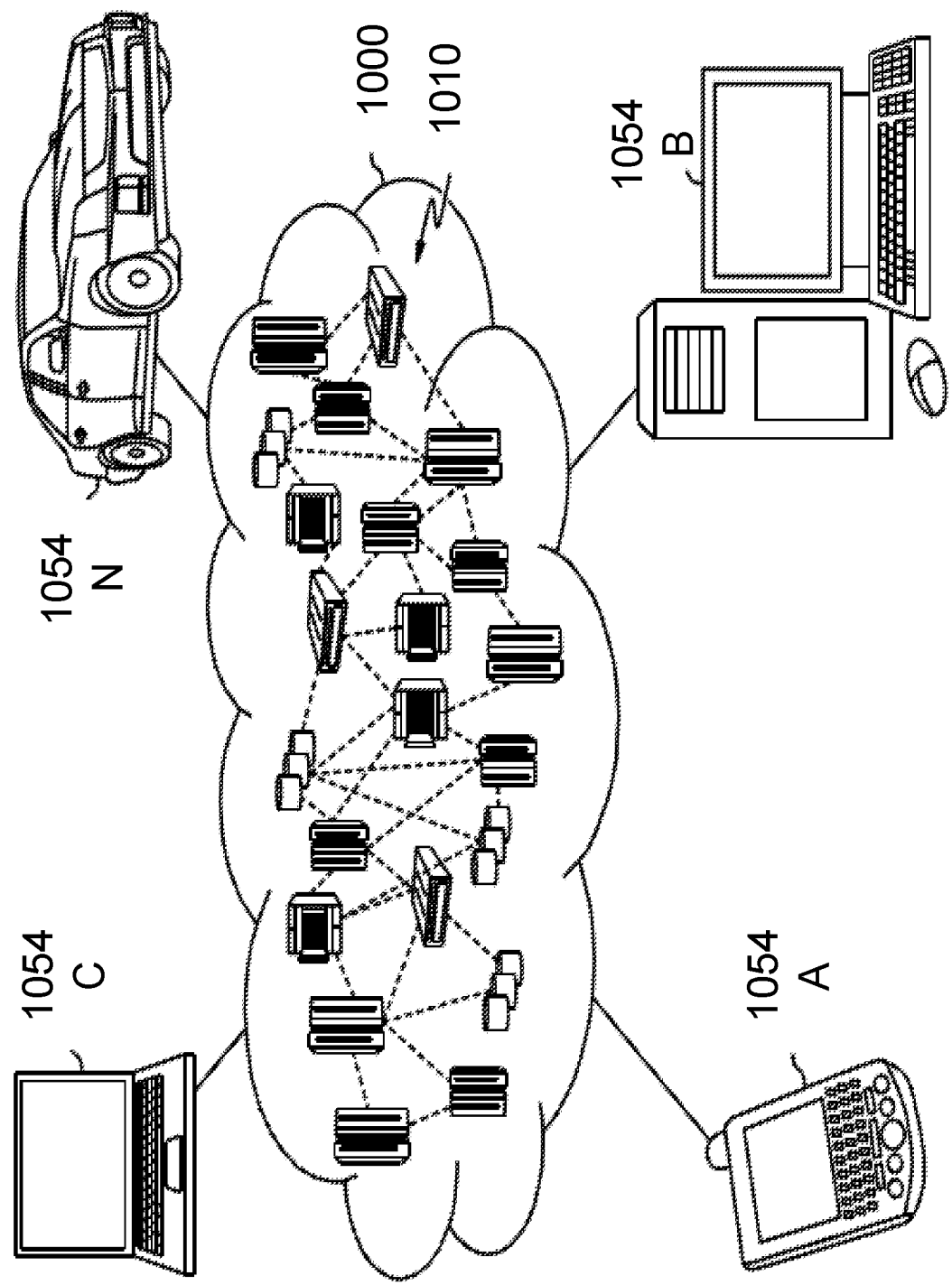
FIG. 10 is an illustrative cloud computing environment, consistent with an illustrative embodiment.

Referring now to FIG. 10, an illustrative cloud computing environment 1010 is depicted. As shown, cloud computing environment 1000 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
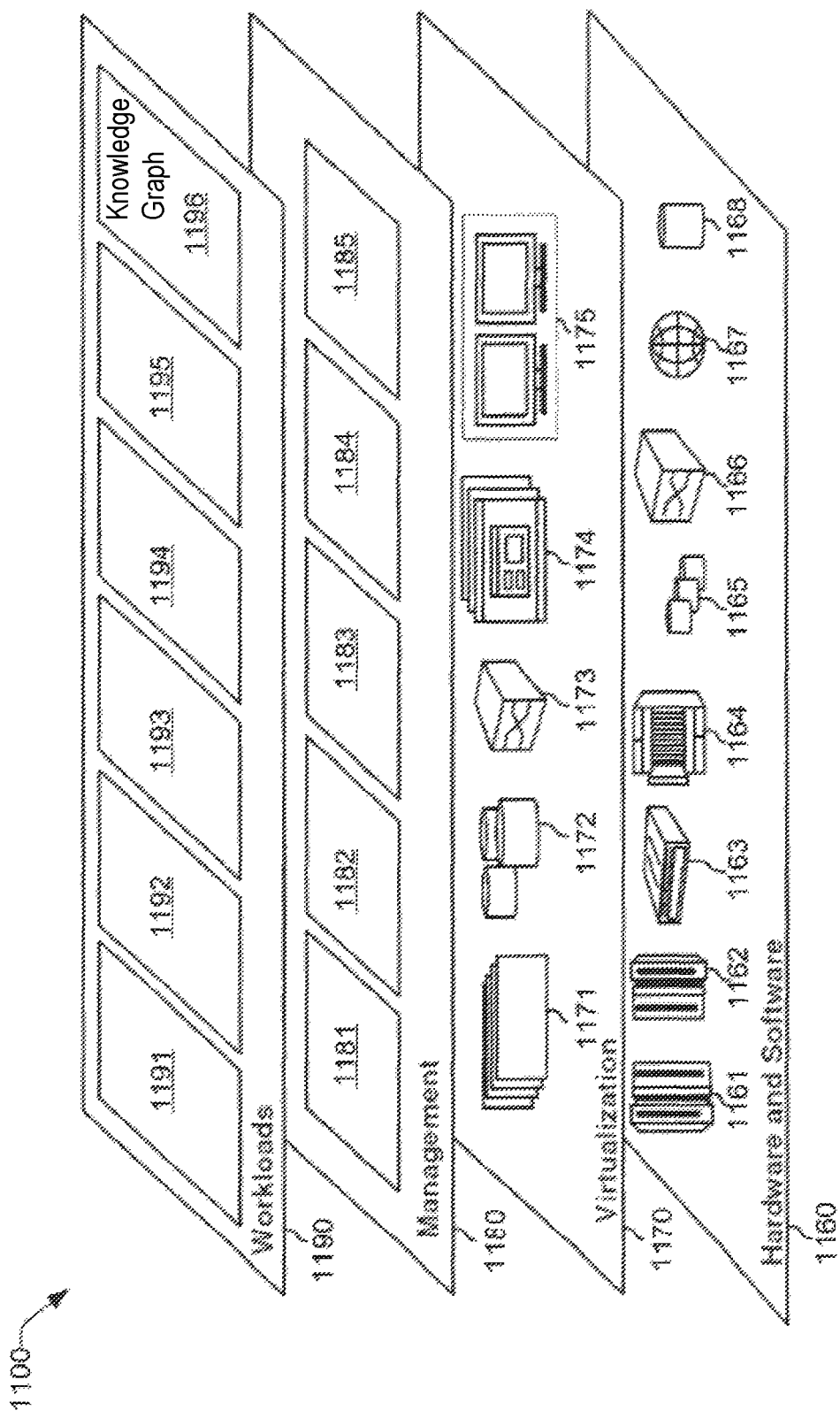
FIG. 11 is a set of functional abstraction layers provided by cloud computing environment of FIG. 10, consistent with an illustrative embodiment.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the disclosure are not limited thereto. As depicted, the following layers and corresponding functions are provided:

Hardware and software layer 1160 include hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, a management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and interaction engine 1196, such as the knowledge graph engine 612 of FIG. 6 and the knowledge graph engine 918 of FIG. 9, to generate an augmented knowledge graph and support operation of the chatbot 602, for example, as discussed herein.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, blocks, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, blocks, features, objects, benefits, and advantages. These also include embodiments in which the components and/or blocks are arranged and/or ordered differently.

Aspects of the present disclosure are described herein with reference to call flow illustrations and/or block diagrams of a method, apparatus (systems), and computer program products according to embodiments of the present disclosure. It will be understood that each block of the flowchart illustrations and/or block diagrams, and combinations of blocks in the call flow illustrations and/or block diagrams, can be implemented in hardware, software, or a combination thereof. In the context of software, the blocks represent computer readable and executable program instructions that, when executed by one or more processors, perform the recited operations. Generally, computer executable instructions may include routines, programs, objects, components, data structures, and the like that perform functions or implement abstract data types.

These computer readable and executable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the call flow process and/or block diagram block or blocks.

The computer readable program instructions may be stored in a non-transitory computer readable storage medium, which may be a tangible device that can retain and store instructions for use by an instruction execution device. The computer readable storage medium may be, for example, but is not limited to, a magnetic storage device an optical storage device, an electromagnetic storage device, or any suitable combination of the foregoing. A non-exhaustive list of more specific examples of a computer readable storage medium includes the following: a portable computer diskette, a hard disk, a random access memory (RAM), a read-only memory (ROM), an erasable programmable read only memory (EPROM or Flash memory), a static random access memory (SRAM), a portable compact disc rad-only memory (CD-ROM), a digital versatile disk (DVD), a memory stick, a floppy disk, a mechanically encoded device such as punch-cards or raised structure in a groove having instructions recorded thereon, and any suitable combination of the foregoing. A computer readable storage medium, as used herein is not to be construed as being transitory signals per se. such as radio waves or freely propagating electromagnetic waves, electromagnetic waves propagating through a waveguide or other transmission media (e.g., light pulses passing through a fiber-optic cable), or electrical signals transmitted through a wire.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, block, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method for generating a knowledge graph by a first computing device, comprising:
    given a skeleton knowledge graph including first terms in respective nodes, wherein first terms in connected nodes have a predetermined relationship, forming an augmented knowledge graph by extracting a second term from a domain corpus to form a term cluster linked with a respective node of the knowledge graph, the second term being associated with the first term of a respective node in the domain corpus and not meeting the predetermined relationship;
    identifying a semantic feature between a pair of the second term and associated first term, in the domain corpus;
    linking the identified semantic feature to the pair in the augmented knowledge graph; and
    identifying the semantic feature between the pair of second term and the first term, in documents of the domain corpus, by:
        performing a shortest dependency path on each pair to identify frequent dependency path patterns and frequent event words in relation instances in documents;
        scoring the relation instances based on the identified frequent dependency path patterns and the identified frequent event words; and
        scoring the documents based on the scoring of the relation instances;
    wherein the augmented knowledge graph is useable by a second computing device to drive a conversation between a chatbot and a user.

2. The computer implemented method of claim 1, wherein the domain corpus includes an unstructured document.

3. The computer implemented method of claim 1, further comprising extracting the second term by:
    searching the domain corpus for second terms associated with each first term; and
    extracting a second term from the documents that shows a sufficient association with the first term in the domain corpus.

4. The computer implemented method of claim 1, further comprising:
    linking a phrase, sentence, a passage, and/or a document from the domain corpus in which the semantic feature is identified, to the pair of the second term and associated first term.

5. The computer implemented method of claim 1, further comprising driving the conversation by the chatbot by:
    receiving a query from a user and, upon determining that the query is ambiguous:
        identifying a first node the user is most interested in; and
        identifying a second term the user is most interested in.

6. The computer implemented method of claim 5, wherein the linked term cluster includes a plurality of second terms, the method further comprising driving the conversation by the chatbot by:
    ranking the second terms in the linked term cluster in a first ranking; and
    presenting the second terms to the user in an order of the first ranking.

7. The computer implemented method of claim 6, wherein a plurality of documents in the domain corpus are linked to a pair of a first term and a second term in the linked term cluster, the method further comprising:
    ranking the linked documents in a second ranking; and
    presenting the linked documents in an order of the second ranking to the user.

8. A computing device comprising:
    a processing device;
    a storage device coupled to the processing device;
    knowledge graph engine code stored in the storage device, wherein execution of the code by the processing device causes the computing device to:
    given a skeleton knowledge graph including first terms in respective nodes, wherein first terms in connected nodes have a predetermined relationship, forming an augmented knowledge graph by extracting a second term from a domain corpus to form a term cluster linked with a respective node of the knowledge graph, the second term being associated with the first term of the respective node in the domain corpus and not meeting the predetermined relationship;
    identifying a semantic feature between a pair of a second term and associated first term, in the domain corpus;
    scoring relation instances based on identified frequent dependency path patterns and identified frequent event words;
    scoring documents based on the scoring of the relation instances; and
    linking the identified semantic feature to the pair in the augmented knowledge graph;
    wherein the augmented knowledge graph is useable by a second computing device to drive a conversation between a chatbot and a user.

9. The computing device of claim 8, wherein the domain corpus includes an unstructured document.

10. The computing device of claim 8, wherein execution of the code by the processing device further causes the computing device to extract the second term by:
    searching the domain corpus for second terms associated with each first term; and extracting a second term from the documents that shows a sufficient association based on the co-occurrence analysis method with the first term in the domain corpus.

11. The computing device of claim 8, wherein execution of the code by the processing device further causes the computing device to:
 link a phrase, sentence, passage, and/or a document from the domain corpus in which the semantic feature is identified, to the pair.

12. The computing device of claim 11, wherein the domain corpus includes documents and execution of the code by the processing device further causes the computing device to identify a semantic feature in the association between the second term and the first term, in the documents, by:
 performing a shortest dependency path on the pair to identify the frequent dependency path patterns and the frequent event words in the relation instances in the documents.

13. The computing device of claim 8, wherein execution of the code by the processing device further causes the computing device to drive the conversation between the chatbot and the user by:
 receiving a query from a user and, upon determining that the query is ambiguous:
 identifying a first node the user is most interested in; and
 identifying a second term the user is most interested in.

14. The computing device of claim 13, wherein the linked term cluster includes a plurality of second terms and execution of the code by the processing device further causes the computing device to drive the conversation between the chatbot and the user by:
 ranking the second terms in the linked term cluster in a first ranking; and
 presenting the second terms to the user in an order of the first ranking.

15. The computing device of claim 14, wherein a plurality of documents in the domain corpus are linked to a pair of a first term and a second term in the linked term cluster and execution of the code by the processing device further causes the computing device to drive the conversation between the chatbot and the user by:
 ranking linked documents from the domain corpus in a second ranking; and
 presenting the linked documents in an order of the second ranking to the user.

16. A non-transitory computer readable storage medium tangibly embodying a computer readable program code having computer readable instructions that, when executed by a computing device, causes a chatbot device to drive a conversation with a user, by:
 using nodes of an augmented knowledge graph including first terms in respective nodes, wherein first terms in connected nodes have a predetermined relationship, the first terms being extracted from a domain corpus, to address non-ambiguous queries;
 using second terms in term clusters linked to respective nodes of the augmented knowledge graph to address ambiguous queries, the second terms in the term clusters being associated with the first terms of the respective nodes in the domain corpus and not meeting the predetermined relationship;
 scoring relation instances based on identified frequent dependency path patterns and identified frequent event words;
 scoring documents based on the scoring of the relation instances;
 ranking the second terms in the linked term cluster in a first ranking; and
 presenting the second terms to the user in an order of the first ranking.

17. The non-transitory computer readable storage medium of claim 16, wherein the augmented knowledge graph links the documents from which the second terms are extracted to pairs of the first terms and each of the second terms linked to the first terms and execution of the computer readable instructions further causes the chatbot device to drive the conversation by:
 ranking the linked documents in a second ranking; and
 presenting the linked documents in an order of the second ranking to the user.

* * * * *